United States Patent
Kondoh et al.

(10) Patent No.: US 6,940,638 B2
(45) Date of Patent: Sep. 6, 2005

(54) OPTICAL FREQUENCY CONVERSION SYSTEMS AND METHODS

(75) Inventors: You Kondoh, Yamato (JP); Norihide Yamada, Kokubunji (JP); Kenichi Abiko, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 209 days.

(21) Appl. No.: 10/414,168

(22) Filed: Apr. 15, 2003

(65) Prior Publication Data

US 2004/0008403 A1 Jan. 15, 2004

(30) Foreign Application Priority Data

Apr. 18, 2002 (JP) ........................ 2002-116596

(51) Int. Cl.[7] ............... G02F 2/02; G02F 1/01
(52) U.S. Cl. ............... 359/326; 385/3; 359/279
(58) Field of Search ............... 359/326–332, 359/279; 385/3

(56) References Cited

U.S. PATENT DOCUMENTS

| | | | |
|---|---|---|---|
| 4,075,698 A | * | 2/1978 | Lode ............... 702/72 |
| 4,904,038 A | | 2/1990 | Chang |
| 5,598,130 A | | 1/1997 | Mesuda et al. |
| 5,619,368 A | | 4/1997 | Swanson |
| 5,734,493 A | | 3/1998 | Jopson |
| 5,781,335 A | | 7/1998 | Derr |
| 6,259,836 B1 | | 7/2001 | Dodds |
| 6,426,828 B1 | | 7/2002 | Gutierrez |
| 2002/0118439 A1 | | 8/2002 | Batchko |

FOREIGN PATENT DOCUMENTS

| | | | |
|---|---|---|---|
| JP | 05-257102 | 10/1993 | |
| JP | 07-092517 | 4/1995 | |
| JP | 08-160481 | 6/1996 | |
| JP | 09-133938 | 5/1997 | |
| JP | 11-218791 | 8/1999 | |
| JP | 2000-250084 A | * 9/2000 | ............ G02F/2/02 |

* cited by examiner

Primary Examiner—John D. Lee

(57) ABSTRACT

Optical frequency conversion systems and methods are described. In one aspect, an optical frequency conversion system for generating a frequency-shifted replica of an input optical signal includes a phase modulation control signal generator and an optical phase modulator. The phase modulation control signal generator receives the input optical signal and generates a phase modulation control signal characterized by a sequence of phase shift control portions synchronized to the input optical signal. The optical phase modulator receives the input optical signal and phase shifts the input optical signal in accordance with the phase shift control portions of the phase modulation control signal to generate a frequency-converted replica of the input optical signal. An optical frequency conversion method for generating a frequency-shifted replica of an input optical signal also is described.

22 Claims, 3 Drawing Sheets

OPTICAL FREQUENCY CONVERSION SYSTEMS AND METHODS

CROSS-REFERENCE TO RELATED APPLICATIONS

Under 35 U.S.C. § 119 this application claims the benefit of co-pending Japanese Patent Application No. 2002-116596, which was filed Apr. 18, 2002, and is incorporated herein by reference.

BACKGROUND

Optical frequency conversion involves generating an output optical signal that is a frequency-adjusted replica of an input optical signal. Optical frequency conversion systems are used in a wide range of applications, including environmental sensing, optical communication, and laser medicine. Optical frequency conversion systems are particularly useful in all-optical fiber-based communication networks. These networks typically include hierarchies of linked local sub-networks and long haul routes, at least some of which may operate at the same optical frequency. The use of wavelength division multiplexing (WDM) in such networks can increase signal capacity and enhance network flexibility. Optical frequency conversion systems are used in WDM optical communications networks to shift frequencies for routing to sub-network links, to perform phase conjugation operations that are used over long haul routes, and to perform various types of optical processing functions.

Many different optical frequency conversion techniques have been proposed. In some approaches, an electrical signal is used to modulate the frequency of an input optical signal based on the electro-optic effect or the acousto-optic effect. These electronic modulation techniques, however, are limited by the speed of the modulation control electronics. Several all-optical frequency conversion techniques also have been proposed, including cross-gain modulation, cross-phase modulation, and four-wave-mixing frequency conversion techniques.

In one non-degenerate four-wave-mixing approach, an input optical signal and a pump optical signal are mixed in a nonlinear medium (e.g., a medium exhibiting a nonlinear index of refraction), which generates conjugate signal frequencies as a function of the input signal frequencies. An optical filter selectively passes an output optical signal corresponding to a frequency-shifted replica of the input optical signal.

In another approach, an input optical signal is propagated through an electro-optic material having a ⅓ rotational symmetry. The input optical signal is circularly polarized in the ⅓ rotational symmetry direction of the electro-optic material. A rotating electric field is applied in a direction perpendicular to the propagation direction of the input optical signal to shift the frequency of the input optical signal. The amount by which the input optical signal frequency is shifted may be increased by providing a feedback loop with a shutoff switch and cycling the input optical signal through the electro-optic material multiple times. The amount of frequency conversion is proportional to the number of times the input optical signal is cycled through the electro-optic material.

In a parallel phase modulation optical frequency conversion approach, an input optical signal is divided into multiple sub-signal light components with prescribed relative phase relationships. The sub-signal light components are distributed into respective optical phase modulators. Each optical phase modulator is driven by a respective radio frequency (RF) signal having a prescribed relative phase relationship with the sub-signal light component passing through the corresponding optical phase modulator. The signals transmitted from the optical phase modulators are combined to produce an output optical signal corresponding to the modulation product of the optical input signal and the RF drive signals, except with a low-order modulation product canceled out and suppressed.

Another optical frequency conversion approach induces a phase shift using moving reflectors, which may be moving mirrors or an acousto-optical filter. The moving reflectors oscillate (i.e., they move first in a first direction and then in a second direction). Two different reflectors are used so that the light can be switched between the reflectors. During a first portion of the cycle the light is coupled to the first reflector which moves in the first direction. The second reflector is out of phase with the first reflector, and the light is switched to that second reflector during a second portion of the cycle. The second reflector also is moving in the first direction when the light is applied thereto. In this way, the light obtains a constant direction Doppler shift.

SUMMARY

The invention features optical frequency conversion systems and methods that enable optical signals to be frequency-converted with an all-optical system over a wide conversion bandwidth and that enable digital-intensity-modulated optical signals to be frequency-converted efficiently.

In one aspect of the invention, an optical frequency conversion system for generating a frequency-shifted replica of an input optical signal includes a phase modulation control signal generator and an optical phase modulator. The phase modulation control signal generator is coupled to receive the input optical signal and is operable to generate a phase modulation control signal characterized by a sequence of phase shift control portions synchronized to the input optical signal. The optical phase modulator is additionally coupled to receive the input optical signal and is operable to phase shift the input optical signal in accordance with the phase shift control portions of the phase modulation control signal to generate a frequency-converted replica of the input optical signal.

In another aspect, the invention features an optical frequency conversion method for generating a frequency-shifted replica of an input optical signal. Based on the input optical signal, a phase modulation control signal characterized by a sequence of phase shift control portions synchronized to the input optical signal is generated. The input optical signal is phase-shifted in accordance with the phase shift control portions of the phase modulation control signal to generate a frequency-converted replica of the input optical signal.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
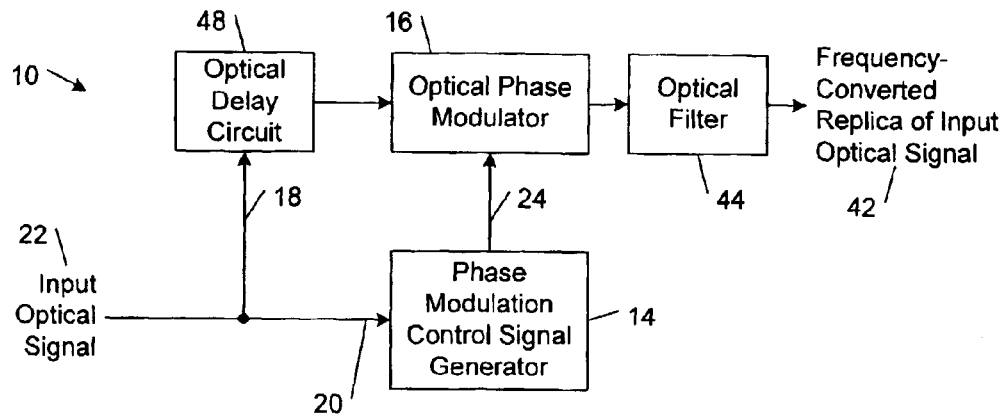
FIG. 1 is a block diagram of an optical frequency conversion system.

FIG. 1 illustrates an embodiment of an optical frequency conversion system 10 that includes a phase modulation control signal generator 14 and an optical phase modulator 16. First and second optical signals 18, 20 corresponding to an input optical signal 22 are distributed to phase modulation control signal generator 14 and optical phase modulator by an optical splitter or and optical coupler or any other suitable means. In general, the first optical signal 18 is a replica of the input optical signal 22 that may be scaled in intensity relative to the input optical signal 22 but still preserves the data and timing content of the input optical signal 22. The second optical signal 20 may be any optical signal from which synchronization information about the input optical signal 22 may be derived. In some implementations, the optical demultiplexer 12 is an optical splitter, in which case each of the first and second optical signals 18, 20 is a replica of the input optical signal 22. As used herein, a "replica" of an original optical signal refers to an exact reproduction that may differ in frequency from the original optical signal.

Figure 2:
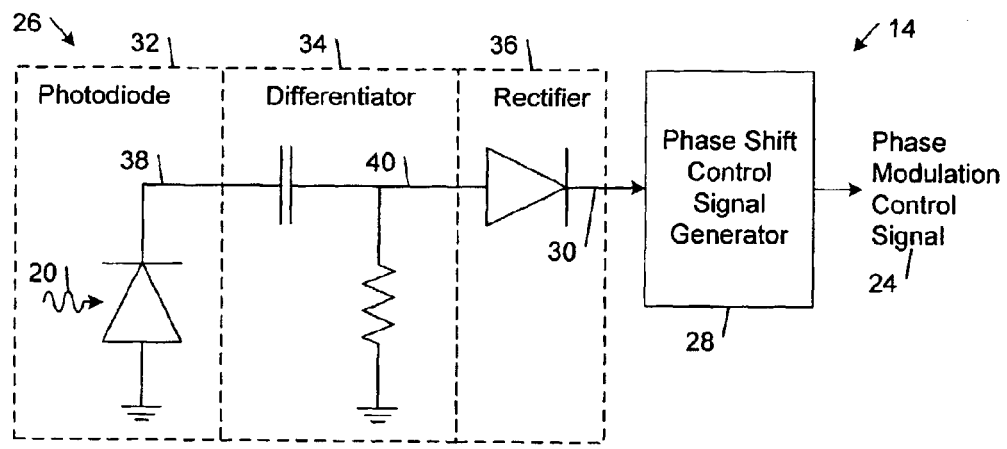
FIG. 2 is a block diagram of an exemplary phase modulation control signal generator.

Referring to FIGS. 1 and 2, the phase modulation control signal generator 14 receives the second optical signal 20 and generates a phase modulation control signal 24 that is characterized by a sequence of phase shift control portions that are synchronized to the input optical signal 22. In one implementation, phase modulation control signal generator 14 includes a synchronizer 26 and a phase shift control portion generator 28. The synchronizer 26 may be any circuit that generates a trigger signal 30 that is synchronized to the second optical signal 20. Trigger signal 30 may be synchronized to the second optical signal 20 by detecting one or both of a start time and an end time of pulses of the second optical signal 20. In the illustrated embodiment, synchronizer 26 includes a photodiode 32, a differentiator 34, and a rectifier 36. The photodiode 32 generates an electrical output signal 38 with a magnitude that tracks the intensity variations in the second optical signal 20. The differentiator 34 produces an electrical output signal 40 that is proportional to the rate of change of the photodiode output signal 38. In this way, differentiator 34 generates an output signal 40 with spikes at the transitions (e.g., leading and trailing edges of pulses) of the photodiode output signal 38. Rectifier 36 converts the spikes in the differentiator output signal 40 to trigger signal 30, which includes short square-topped pulses synchronized to the leading edges of pulses in the second optical signal 20. Phase shift control signal generator 28 generates the phase modulation control signal 24 based on the pulses of trigger signal 30. In implementations in which only the start times or the end times of pulses of the second optical signal 20 are detected, a phase-locking technique may be used to determine the time intervals for the phase shift control portions of the phase modulation control signal 24.

Optical phase modulator 16 phase shifts the first optical signal 18 in accordance with the phase shift control portions received from the phase modulation control signal generator 14. In some implementations, optical phase modulator is an electro-optic phase modulator (e.g., a lithium niobate electro-optic phase modulator). Assuming that the amplitude of the first optical signal 18 as a function of time (t) is expressed as $A \cdot \sin(\omega_0 t + \Phi)$, where $A$, $\omega_0$, and $\Phi$ are the maximum amplitude, the angular frequency, and the phase of first optical signal 18. In response to an applied phase shift control portion V that is generated by phase modulation control signal generator 14, the optical phase modulator 16 shifts the phase of first optical signal 18 in accordance with the following phase modulation relational formula: $\Phi = aV + b$, where a and b are constants. Accordingly, the amplitude of the first optical signal 18 as a function of time (t) may be expressed as $A \cdot \sin(\omega_0 t + aV + b)$. In some embodiments, the phase shift control portions of the phase modulation control signal 24 have respective magnitudes that vary at a substantially constant non-zero rate so that a single frequency shift with no harmonics may be achieved. In these embodiments, with the mapping $aV + b = \omega_m t + \Phi_0$, the amplitude of the frequency-shifted replica of the first optical signal 18 as a function of time (t) may be expressed as:

$$A \cdot \sin(\omega_0 t + aV + b) = A \cdot \sin(\omega_0 t + \omega_m t + \Phi_0) = A \cdot \sin\{(\omega_0 + \omega_m)t + \Phi_0\}$$

where $\omega_m$ is the angular frequency shift and $\Phi_0$ is the phase of the frequency-shifted replica of the first optical signal 18. That is, in response to a constantly varying phase shift control portion V, the optical phase modulator 16 generates a replica 42 (FIG. 1) of the input optical signal 22 that is frequency-shifted by an angular frequency $\omega_m$. The frequency shift of the input optical signal may be positive or negative depending on whether $\omega_m$ is positive or negative (i.e., whether the phase shift control portions (V) vary at a positive rate or a negative rate).

Referring back to FIG. 1, optical frequency conversion system 10 includes an optical filter 44 that selectively outputs the ($\omega_0 + \omega_m$) frequency component of the optical signal generated at the output of the optical phase modulator 16. Optical filter 44 may be a bandpass filter, a low-pass filter, or a high-pass filter depending on how the optical frequency conversion system 10 is implemented.

Figure 3:
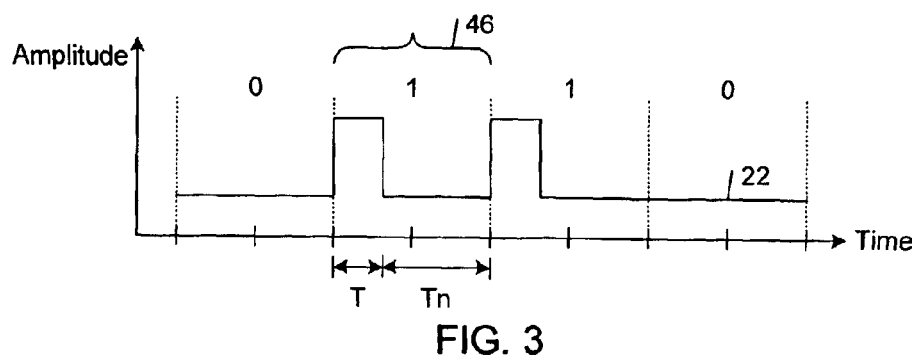
FIG. 3 is a graph of the amplitude of an exemplary input optical signal plotted as a function of time.

FIG. 3 illustrates an exemplary input optical signal 22 that is encoded with a sequence of bits 46 each of which includes a bit-state phase (T) and a non-bit-state phase (Tn). In the illustrated example, input optical signal 22 is encoded digitally in accordance with a return-to-zero encoding scheme in which the binary low and high states, represented by numerals 0 and 1, are transmitted by optical pulses having certain characteristics. In particular, the signal state is determined by the amplitude during the bit-state phase of each data binary digit. The signal returns to a resting state (called zero) during the non-bit-state phase of each bit. The resting state may have zero or non-zero amplitude. In positive-logic return-to-zero encoding (illustrated in FIG. 3), the low state is represented by the less positive signal amplitude, and the high state is represented by the more positive signal amplitude. In negative-logic return-to-zero encoding, the low state is represented by the more positive signal amplitude, and the high state is represented by the less positive signal amplitude.

Figure 4:
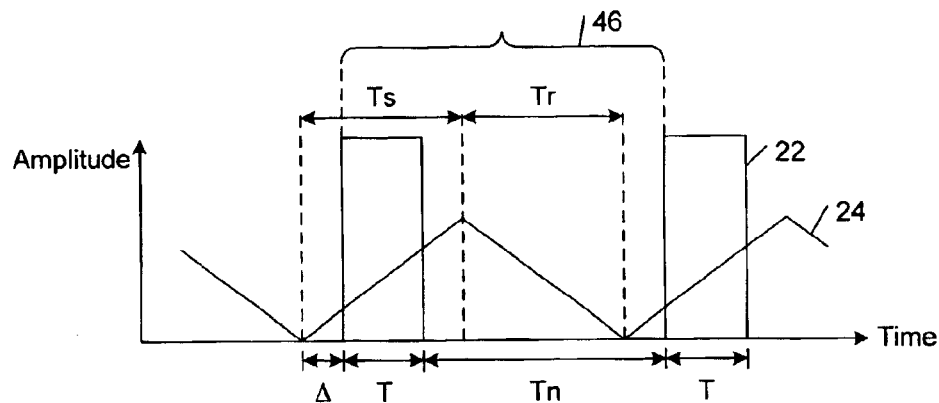
FIG. 4 is a graph of the amplitudes of an exemplary phase modulation control signal and an input optical signal plotted as functions of time.

FIG. 4 illustrates the timing relationships between an exemplary phase modulation control signal 24 and a representative portion of the exemplary input optical signal 22 of FIG. 3. In the illustrated example, phase modulation control signal 24 corresponds to a triangle electrical waveform that is generated by the phase shift control portion generator 28 (FIG. 2) based on trigger signal 30. In this case, phase shift control portion generator 28 may be implemented in the form of any triangle waveform generator (e.g., a one-shot triangle-wave generator circuit). In the illustrated example, phase shift control portions of phase modulation control signal 24 correspond to the linear, positively sloped segments of the triangle waveform. These linear segments overlap in time with the bit-state phases (T) of input optical signal 22.

Referring to FIGS. 1 and 4, in the illustrated embodiment, optical frequency conversion system 10 includes an optical delay circuit 48 (e.g., an optical fiber loop) that delays the first optical signal 18 such that the optical phase modulator 16 receives each bit-state phase of the first optical signal after receiving each corresponding phase shift control portion. The amount of delay (Δ) that is introduced by optical delay circuit 48 may correspond to an amount of time that is sufficient to avoid nonlinearities that might be present at the start of each phase shift control portion (i.e., the positively sloped linear segments of the triangle waveform in the example illustrated in FIG. 4). As shown in FIG. 4, the phase shift control portions may extend over respective periods (Ts) that are longer than the periods (T) of the bit-state phases of the input optical signal bits 46 to avoid nonlinearities that might be present at the start and end times of the phase shift control portions of the triangle waveform. Each phase shift control portion is followed by a respective reset phase (Tr) during which the phase modulation control signal 24 returns to the initial amplitude value. The amplitude variations during the reset phases may be linear or nonlinear. In addition, the amplitude variations during the phase shift control portion phase and the reset phase may be symmetrical as shown in FIG. 4, or they may be asymmetrical.

Figure 5:
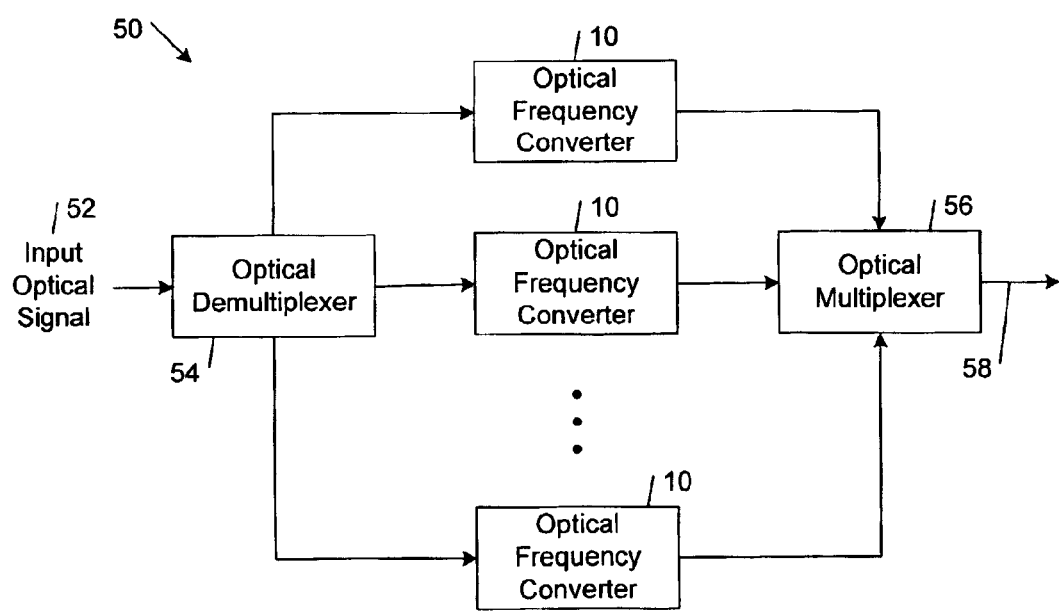
FIG. 5 is a block diagram of an optical frequency conversion system configured to handle multi-wavelength input optical signals.

FIG. 5 shows an embodiment of an optical frequency conversion system 50 that is configured to handle a multi-wavelength input optical signal 52. Optical frequency conversion system 50 includes multiple optical frequency converters 10 (FIG. 1), an optical demultiplexer 54, and an optical multiplexer 56. Optical demultiplexer 54 (e.g., a wavelength-division demultiplexer) distributes respective wavelength components of input optical signal 52 to the optical frequency converters 10. In response, optical frequency converters 10 generate respective frequency-converted replicas of the received wavelength components of the input optical signal 52. Optical multiplexer 56 (e.g., a wavelength-division multiplexer) is coupled to the outputs of the optical frequency converters and combines the frequency-converted replicas of the input optical signal 52 into a combined output optical signal 58.

Figure 6:
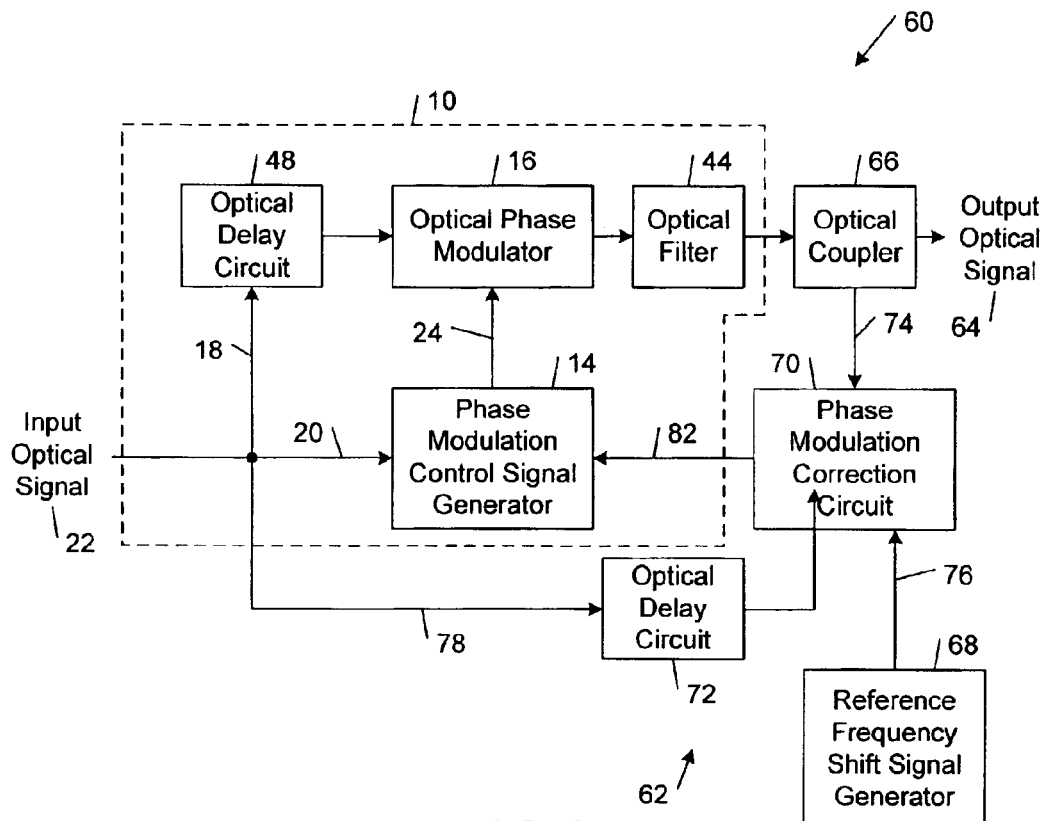
FIG. 6 is a block diagram of an optical frequency conversion system that includes a feedback loop with a phase modulation correction circuit.

FIG. 6 shows an embodiment of an optical frequency conversion system 60 that includes the components of the optical frequency conversion system 10 (FIG. 1) and a feedback loop 62 for tuning the phase shift control portions that are generated by the phase modulation control signal generator 14 to produce an output optical signal 64 with a target optical frequency shift relative to input optical signal 22. Feedback loop 62 includes an optical coupler 66, a reference frequency shift signal generator 68, a phase modulation correction circuit 70, and an optical delay circuit 72. Optical coupler 66 guides a feedback optical signal 74, which corresponds to a portion of the frequency-converted replica 42 of the optical input signal 22, to the phase modulation correction circuit 70. Reference frequency shift signal generator 68 generates an electrical reference frequency shift signal 76 that has frequency corresponding to a target frequency shift of the output optical signal 64 relative to the input optical signal 22. Optical delay circuit 72 is coupled between the optical demultiplexer 12 and the phase modulation correction circuit 70 and delays receipt by phase modulation correction circuit 70 of a third optical signal 78 that is derived from and corresponds to a replica of the input optical signal 22. The amount of delay introduced by optical delay circuit 72 is selected so that the feedback optical signal 74 and the third optical signal 78 are synchronized.

Figure 7:
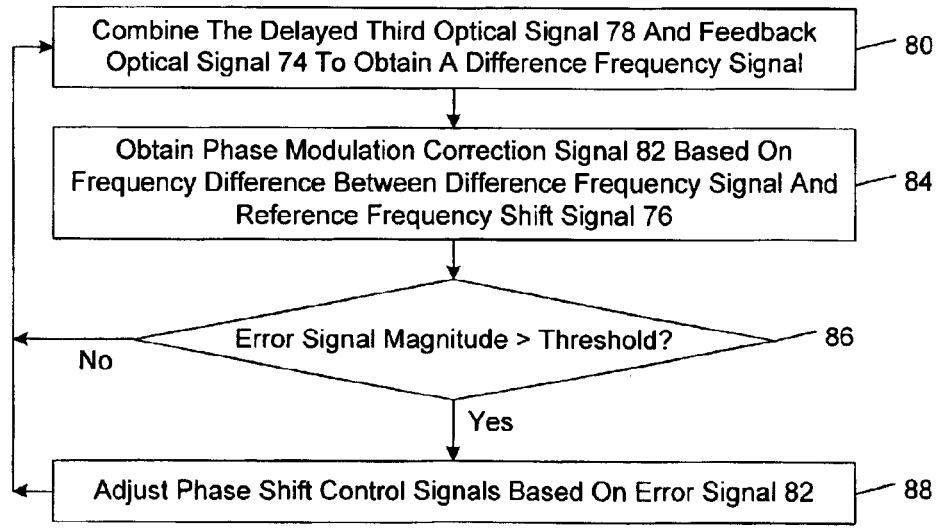
FIG. 7 is a flow diagram of a method of correcting phase modulation in the optical frequency conversion system of FIG. 6.

Referring to FIG. 7, in operation, the delayed third optical signal 78 and the feedback optical signal 74 are combined in a heterodyne mixer (e.g., a photodetector) of phase modulation correction circuit 70 (step 80). An electrical difference frequency signal, which has a frequency corresponding to the frequency difference between the third optical signal 78 and the feedback optical signal 74, is obtained from the resulting modulation product. A phase modulation correction signal 82 (FIG. 6) is obtained by detecting the frequency difference between the frequency of the difference frequency signal and the frequency of the reference frequency shift signal 76 (step 84). If the magnitude of the phase modulation correction signal 82 is greater than a prescribed threshold (step 86), phase modulation control signal generator 14 adjusts the phase shift control portions based on the phase modulation correction signal 82 (step 88). The adjustment to the phase shift control portions may be determined readily, for example, from the above-described relationships between the variation rate of the modulation voltage (V) and the angular frequency shift ($\omega_m$). The phase modulation correction process is repeated for each bit of input optical signal 22.

Other embodiments are within the scope of the claims.

What is claimed is:

1. An optical frequency conversion system for generating a frequency-shifted replica of an input optical signal, comprising:
    a phase modulation control signal generator coupled to receive the input optical signal and operable to generate a phase modulation control signal characterized by a sequence of phase shift control portions synchronized to the input optical signal;
    an optical phase modulator additionally coupled to receive the input optical signal and operable to phase shift the input optical signal in accordance with the phase shift control portions of the phase modulation control signal to generate a frequency-converted replica of the input optical signal.

2. The system of claim 1, wherein
    the input optical signal is encoded with a sequence of bits each having a bit-state phase and a non-bit-state phase,
    the phase modulation control signal is synchronized to the bit-state phases of the input optical signal, and
    the optical phase modulator is operable to phase shift at least the bit-state phases of the input optical signal bits.

3. The system of claim 2, further comprising an optical delay circuit operable to delay receipt of the input optical signal by the optical phase modulator.

4. The system of claim 3, wherein the optical delay circuit is operable to delay the input optical signal such that the optical phase modulator receives each bit-state phase of the input optical signal after receiving each corresponding phase shift control portion.

5. The system of claim 2, wherein the phase modulation control signal generator is operable to synchronize the phase shift control portions to the bit-state phases of the input optical signal bits.

6. The system of claim 5, wherein the phase modulation control signal generator is operable to synchronize the phase shift control portions based on detection of start times for the bit-state phases of the input optical signal bits.

7. The system of claim 5, wherein the phase modulation control signal generator is operable to synchronize the phase shift control portions based on detection of end times for the bit-state phases of the input optical signal bits.

8. The system of claim 5, wherein the phase modulation control signal generator is operable to synchronize the phase shift control portions based on detection of start times and end times for the bit-state phases of the input optical signal bits.

9. The system of claim 1, wherein the phase shift control portions have respective magnitudes that vary at a substantially constant non-zero rate corresponding to the optical frequency shift of the frequency-converted replica of the input optical signal relative to the input optical signal.

10. The system of claim 9, wherein each phase shift control portion is followed by a respective reset phase of the phase modulation control signal.

11. The system of claim 1, wherein the phase modulator is an electro-optic phase modulator.

12. The system of claim 1, further comprising an optical filter coupled to the optical phase modulator and operable to selectively output the frequency-converted replica of the input optical signal.

13. The system of claim 1, further comprising a phase modulation correction circuit operable to generate a frequency conversion correction signal based on a frequency comparison of the input optical signal and the frequency-converted replica of the input optical signal, wherein the phase modulation control signal generator is operable to adjust the phase shift control portions based on the frequency conversion correction signals to achieve a target optical frequency for the frequency-converted replica of the input optical signal.

14. The system of claim 13, wherein the phase modulation correction circuit is operable to obtain a difference frequency signal having a frequency corresponding to a difference in frequency between the input optical signal and the frequency-converted replica of the input optical signal, and to frequency compare the difference frequency signal with a reference frequency shift signal having a frequency corresponding to a target optical frequency shift of the frequency-converted replica relative to the input optical signal.

15. The system of claim 14, wherein the phase modulation correction signal corresponds to a measure of optical frequency difference between the reference frequency shift signal and the difference frequency signal.

16. The system of claim 1, further comprising:
an optical demultiplexer operable to distribute respective wavelength components of the input optical signal;
multiple optical frequency converters each coupled to receive a respective wavelength component of the input optical signal from the optical demultiplexer and each including a phase modulation control signal generator operable to generate a phase modulation control signal characterized by a sequence of phase shift control portions synchronized to the received wavelength component of the input optical signal, and an optical phase modulator coupled to the phase modulation control signal generator and operable to phase shift the received wavelength component of the input optical signal in accordance with the phase shift control portions generated by the associated phase modulation control signal generator to generate a respective frequency-converted replica of the received wavelength component of the input optical signal; and an optical multiplexer coupled to each of the optical phase modulators and operable to combine the frequency-converted replicas of the wavelength components of the input optical signal into a combined output optical signal.

17. An optical frequency conversion method for generating a frequency-shifted replica of an input optical signal, comprising:

based on the input optical signal generating a phase modulation control signal characterized by a sequence of phase shift control portions synchronized to the input optical signal; and phase shifting the input optical signal in accordance with the phase shift control portions of the phase modulation control signal to generate a frequency-converted replica of the input optical signal.

18. The method of claim 17, wherein the input optical signal is encoded with a sequence of bits each having a bit-state phase and a non-bit-state phase, the phase modulation control signal is synchronized to the bit-state phases of the input optical signal, and at least the bit-state phases of the input optical signal bits are phase-shifted.

19. The method of claim 18, further comprising delaying the input optical signal such that each corresponding phase shift control portion is generated before each corresponding bit-state phase of the input optical signal is phase-shifted.

20. The method of claim 18, further comprising synchronizing the phase shift control portions based on detection of one or both of a start time and an end time for each of the bit-state phases of the input optical signal bits.

21. The method of claim 17, further comprising adjusting the phase shift control portions based at least in part on a frequency comparison of the input optical signal derived from the input optical signal and the frequency-converted replica of the input optical signal.

22. The method of claim 17, further comprising:
dividing the input optical signal into multiple wavelength components;
respectively subjecting each wavelength component to the phase modulation control signal generating and phase shifting steps to generate respective frequency-converted replicas of the wavelength components; and
combining the frequency-converted wavelength components into a combined output optical signal.

* * * * *